S. Lamb,
Cotton Press.

N° 3,489. Patented Mar. 16, 1844.

UNITED STATES PATENT OFFICE.

SETH LAMB, OF NEW YORK, N. Y.

IMPROVEMENT IN COTTON-PRESSES.

Specification forming part of Letters Patent No. 3,489, dated March 16, 1844.

*To all whom it may concern:*

Be it known that I, SETH LAMB, of the city, county, and State of New York, have invented an Improvement in Cotton-Presses; and I do hereby declare that the following is a full, clear, and exact description thereof, reference being had to the accompanying drawings, showing detached parts of the machine.

The nature of my improvement consists in making the foot-blocks movable and the apparatus connected therewith for that purpose, all the other parts of the machine remaining the same as described in my patent granted the 12th of May, 1843.

To the foot-block $b$ two braces or tail-pieces, $b^2$, are firmly affixed which, are parallel with and rest upon the two side pieces of the frame $a$ and projecting back of the foot-block. On the upper side of these pieces $b^2$ are formed ratchets, into which a pawl, $d^2$, catches. This pawl is formed of a cross-piece, that takes into the ratchet; and two connecting-bars, that extend down one on each side of the side piece, $a$, and have a pin pass through them, securing them to said piece $a$, so as to allow them to swivel. These hold the foot-block in any required place within the compass of the ratchet. A shaft, $c^2$, is put through both side pieces of the frame horizontally underneath the foot-block braces, and has a bearing in each side piece, out of which a mortise is cut from the upper side large enough to receive cog-wheels $h^2$, that move the shaft near each end and about in the center of the pieces $a$. These work into a rack on the under side of the braces $b^2$, above named, and as the shaft is turned move the foot-block back and forth. One end of the shaft extend, out beyond the side of the press, and has on it a lever, $l'$, that turns independent of the shaft, and outside of this lever a ratchet, which is fixed on the shaft, and on the lever a pawl is attached that works into the wheel, by which means the lever is made to work the shaft. The operation of this is to take up the slack when the bale is put in before beginning to bring down the follower.

Figure 3:
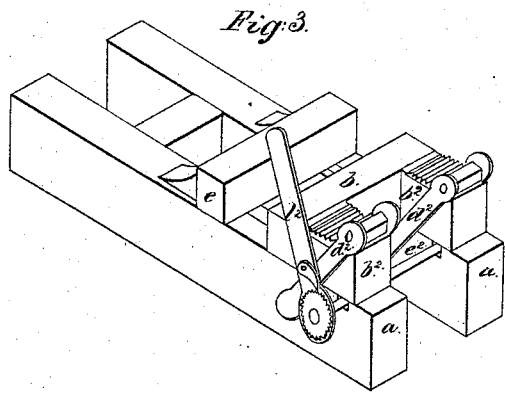
Figure 4:
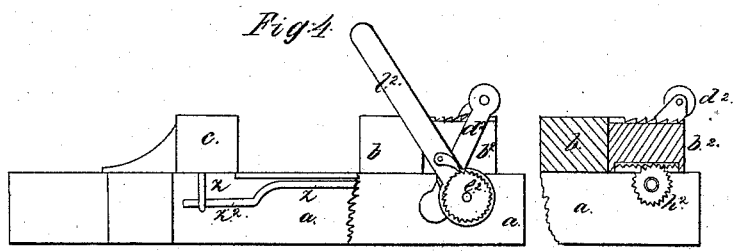
Figure 5:
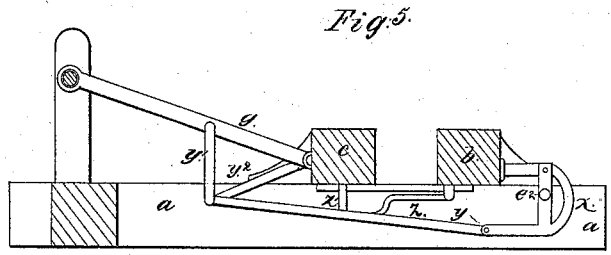

Another modification is shown in Fig. 5, in which, instead of the above apparatus, two segments of wheels, $x$, are hung on the shaft $e^2$. Inside the frame, on each side from the upper side of this segment of semi-wheels, a short bar connects it with the foot-block $b$, the bar being jointed at each end. From the lower side of the segment a projecting arm, $y$, is jointed the other end of which extends forward under the two blocks of the press, and is connected to the lever $z$ by a shackle-bar, $y'$, about one-third of the length of lever $z$ from the follower $c$, and is stayed by a stay-brace, $y^2$, extending from the follower to the point of junction of the arm $y$ and shackle-bar $y'$, the descent of which, it will be perceived, forces up the foot-block toward the follower. The bed $z$, on which the bale is placed, has a projection, $z^2$, from the end next the follower $c$, which is bent downward and then forward again horizontally. This slides through a loop, $z'$, in the under side of the follower, and supports the bed in its proper level till the loop $z'$ reaches the jog, when that end of the bed descends and leaves the bale free. On the follower $c$ receding the bed is again raised.

What I claim as my invention, and desire to secure by Letters Patent, is—

1. The combination of the pawl and racks with the foot-block of a press constructed and arranged in the manner and for the purpose herein set forth.

2. In combination with the movable foot-block, the segment $x$, and lever $y$, by which it is connected with the main levers $g$, in the manner described.

3. The employment of the falling bed $z$, on which the bale rests, constructed and arranged as before specified, so that it shall remain in its position till the bale is pressed, when it falls out of the way till the bale is tied and the levers connected with the head-block start back.

SETH LAMB.

Witnesses:
J. J. GREENOUGH,
L. CALDWELL.